(12) United States Patent
Norbut

(10) Patent No.: US 12,244,259 B1
(45) Date of Patent: Mar. 4, 2025

(54) SUPPORT SYSTEM

(71) Applicant: NSF EPC, LLC, Rochester, NY (US)

(72) Inventor: David Christopher Norbut, Rochester, NY (US)

(73) Assignee: NSF EPC, LLC, Rochester, NY (US)

( * ) Notice: Subject to any disclaimer, the term of this patent is extended or adjusted under 35 U.S.C. 154(b) by 0 days.

(21) Appl. No.: 18/771,870

(22) Filed: Jul. 12, 2024

(51) Int. Cl.
*H02S 20/10* (2014.01)

(52) U.S. Cl.
CPC .................................. *H02S 20/10* (2014.12)

(58) Field of Classification Search
None
See application file for complete search history.

(56) References Cited

U.S. PATENT DOCUMENTS

| | | | | |
|---|---|---|---|---|
| 611,233 | A * | 9/1898 | Brown | E04H 12/2215 52/165 |
| 700,077 | A * | 5/1902 | Peebles | E04H 12/2215 52/153 |
| 4,010,504 | A * | 3/1977 | Griffin | E05D 7/04 16/252 |
| 4,553,739 | A * | 11/1985 | Baines | E06B 11/021 49/34 |
| RE32,934 | E * | 5/1989 | Baines | E06B 11/021 49/34 |
| 4,939,037 | A * | 7/1990 | Freeman | G09F 7/18 428/34.4 |
| 5,893,807 | A * | 4/1999 | Aikens | A63B 63/00 473/422 |
| 5,966,867 | A * | 10/1999 | Downer | A01G 17/04 47/46 |
| 5,992,828 | A * | 11/1999 | Burdick | H05C 1/00 256/10 |
| 6,145,246 | A * | 11/2000 | Galbraith | A01G 17/06 47/46 |
| 8,832,938 | B2 | 9/2014 | Gies | |
| 9,611,609 | B2 | 4/2017 | Kelleher | |

(Continued)

FOREIGN PATENT DOCUMENTS

WO 2022120434 A1 6/2022

OTHER PUBLICATIONS

Convert-1P Tracker with Groundscrew, Installation Manual, Valmont Solar North America, V2.1_1P (43 pp).

(Continued)

*Primary Examiner* — Steven M Marsh
(74) *Attorney, Agent, or Firm* — NIXON PEABODY LLP

(57) ABSTRACT

A support system includes a post having first and second portions. The first portion is configured to be positioned at least partially below ground, and the second portion is configured to be coupled to the first portion and above the ground. The second portion has first and second post apertures. A U-bolt is configured to abut the first portion such that first and second legs of the U-bolt are positioned, respectively, at least partially through the first and second post apertures. A plate having first and second plate apertures is configured to abut the second portion such that the first and second plate apertures at least partially align, respectively, with the first and second post apertures. First and second nuts are configured to be secured, respectively, to the first and second legs of the U-bolt to help secure the plate and the second portion to the first portion.

20 Claims, 11 Drawing Sheets

(56) References Cited

U.S. PATENT DOCUMENTS

| | | |
|---|---|---|
| 10,284,135 B2 | 5/2019 | Collins |
| 11,683,004 B2 | 6/2023 | Krause |
| 2011/0005512 A1 | 1/2011 | Ruesswick |
| 2011/0041834 A1 | 2/2011 | Liao |
| 2014/0041292 A1* | 2/2014 | Babcock ............... A01M 29/32 47/20.1 |
| 2018/0175782 A1 | 6/2018 | Unruh |
| 2023/0012937 A1 | 1/2023 | Huzyak |

OTHER PUBLICATIONS

Convert-1P Single-Axis Solar Tracker | 1-In-Portrait, Brochure, Valmont Industries, Inc., 2022 (2 pp).
Convert-2P Single-Axis Solar Tracker | 2-In-Portrait, Brochure, Valmont Industries, Inc., 2022 (2 pp).
Convert TRJ Single-Axis Tracker, Brochure, Valmont Industries, Inc., 2019 (2 pp).
Large Solar Panel Pole Mount | Adjustable Pitch; Missouri Wind and Solar, https://windandsolar.com/single-250-watt-solar-panel-top-of-pole-mounting-rack, accessed Oct. 16, 2024 (3 pp).
TPSM-10-15-SP—Solar Panel Pole Mount for 10W-15W Solar Panels, Any Panel Between 10" and 14" Wide, Mounts to 1.6" to 4.5" Dia Poles, 0-9deg Tilt Adj, 110MPH Wind Rating, Tycon Solar, Amazon.com, https://www.amazon.com/TPSM-10-15-SP-Panels-Between-Mounts-0-90deg/dp/B0C1D1Q79B, accessed Oct. 16, 2024 (4 pp).

* cited by examiner

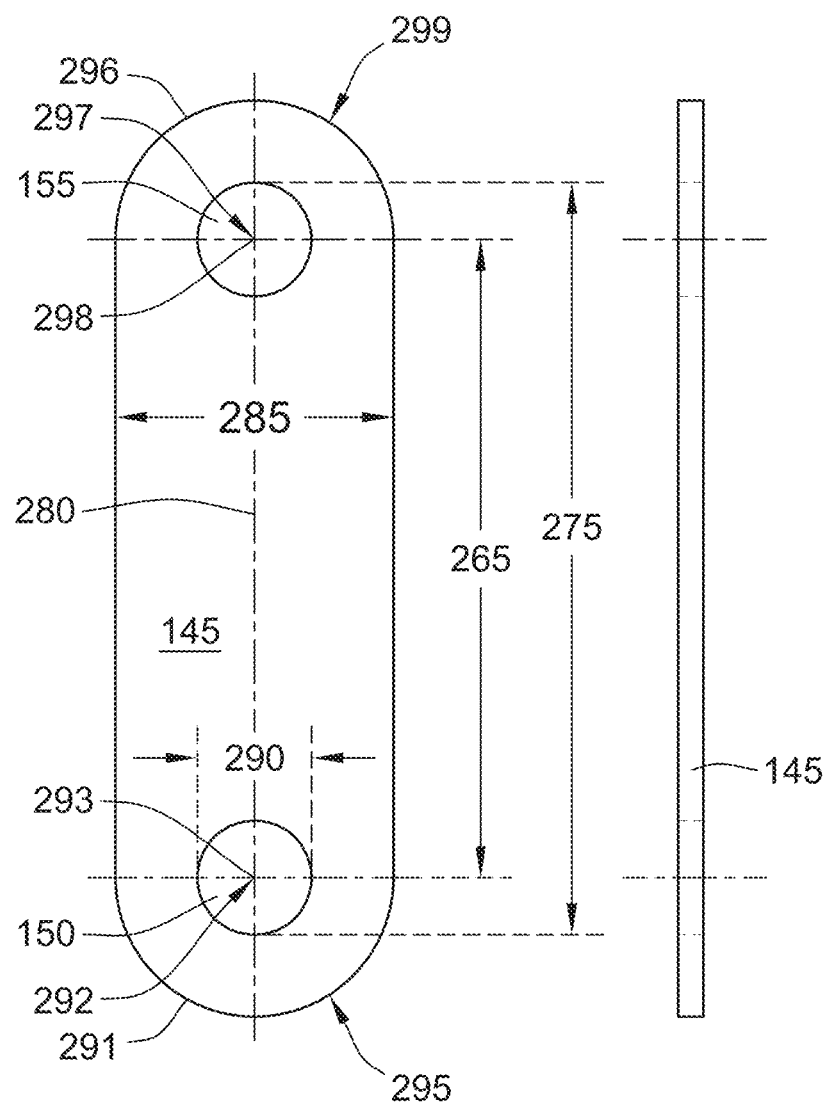

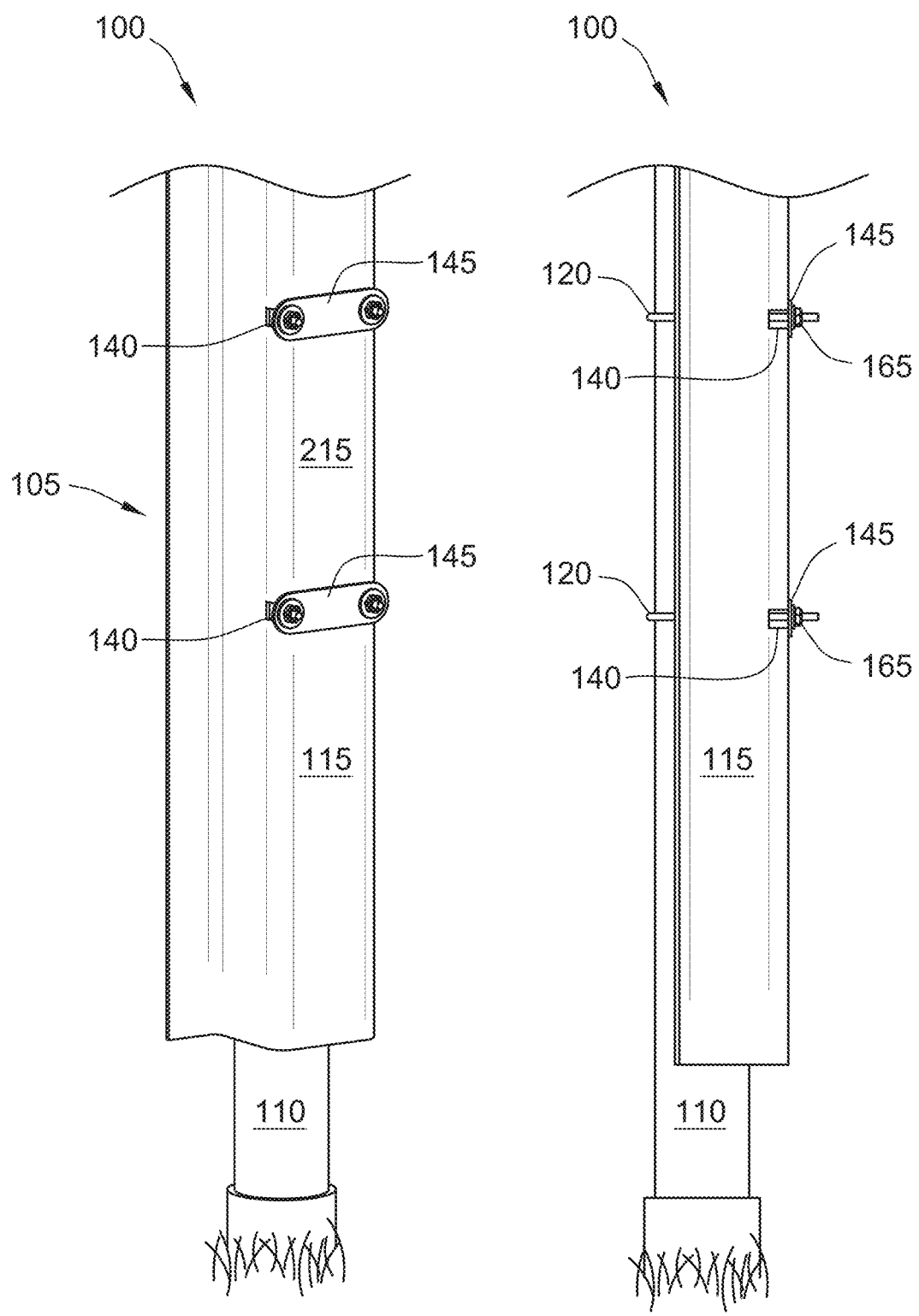

SUPPORT SYSTEM

TECHNICAL FIELD

The present disclosure relates generally to a support system for solar panels. More particularly, the present disclosure relates to a support system for supporting solar panels, where the support system is strengthened to resist buckling and other structural damage due to wind.

BACKGROUND

Solar energy farms comprising thousands of individual solar panels have become common. Each solar panel is installed on a support that elevates the solar panel above ground level, which is advantageous in aligning the solar panel in a desired orientation. However, mounting the solar panel above ground level exposes the solar panel to wind. Due to the geometry of the solar panel being a rigid generally planar panel, such exposure to the wind makes the solar panel, and the support on which it is mounted, susceptible to the force of the wind. A traditional support for a solar panel can fail when exposed to the wind by bending or entirely bucking under the force of the wind.

A need therefore need exists for a solar panel support system that resists bending and buckling under the force of wind. Because there are so many currently installed solar panels, it would be beneficial if the solar panel support system could improve supports for the existing installed solar panels without having to entirely replace them. It would be further beneficial if the solar panel support system could be applied easily to the existing supports with minimal effort and cost.

SUMMARY

According to some implementations of the present disclosure, a support system comprises a post having a first portion and a second portion. The first portion of the post is configured to be positioned at least partially below ground. The second portion of the post is configured to be coupled to the first portion of the post such that the second portion of the post is above the ground. The second portion of the post has a channel disposed along a longitudinal axis of the post. The channel is defined by a first sidewall, a base, and a second sidewall, a junction of the first sidewall and the base defining a first seam and a junction of the second sidewall and the base defining a second seam. The second portion of the post has a first post aperture and a second post aperture, the first post aperture being through at least a portion of the first seam and the second post aperture being through at least a portion of the second seam. A U-bolt is configured to abut the first portion of the post such that a first leg of the U-bolt is positioned at least partially through the first post aperture of the second portion of the post and a second leg of the U-bolt is positioned at least partially through the second post aperture of the second portion of the post. A plate having a first plate aperture and a second plate aperture is configured to abut a portion of the base of the channel of the second portion of the post such that first plate aperture at least partially aligns with the first post aperture and the second plate aperture at least partially aligns with the second post aperture. A first nut is configured to be secured to the first leg of the U-bolt and a second nut is configured to be secured to the second leg of the U-bolt to aid in securing the plate and the second portion of the post to the first portion of the post.

The above summary is not intended to represent each implementation or every aspect of the present disclosure. Additional features and benefits of the present disclosure are apparent from the detailed description and figures set forth below.

BRIEF DESCRIPTION OF THE DRAWINGS

FIG. 11 is a plan view of an exemplary plate, according to some implementations of the present disclosure;

FIG. 12 is a side view of the exemplary plate of FIG. 11;

FIG. 13 is a first elevational close up view of an assembled support system, according to some implementations of the present disclosure;

FIG. 14 is a second elevational close up view of an assembled support system of FIG. 13.

Figure 1A:
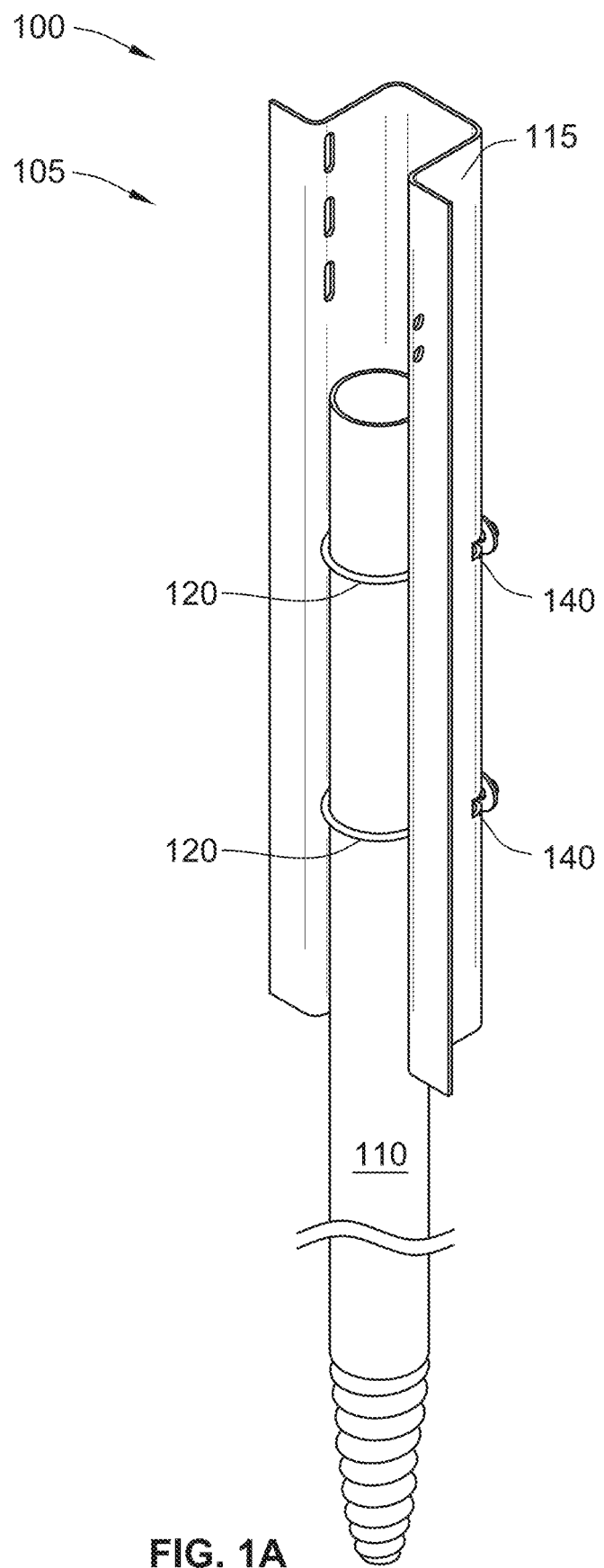
FIG. 1A is a first perspective view of an assembled support system, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION OF THE ILLUSTRATED IMPLEMENTATIONS

Figure 1B:
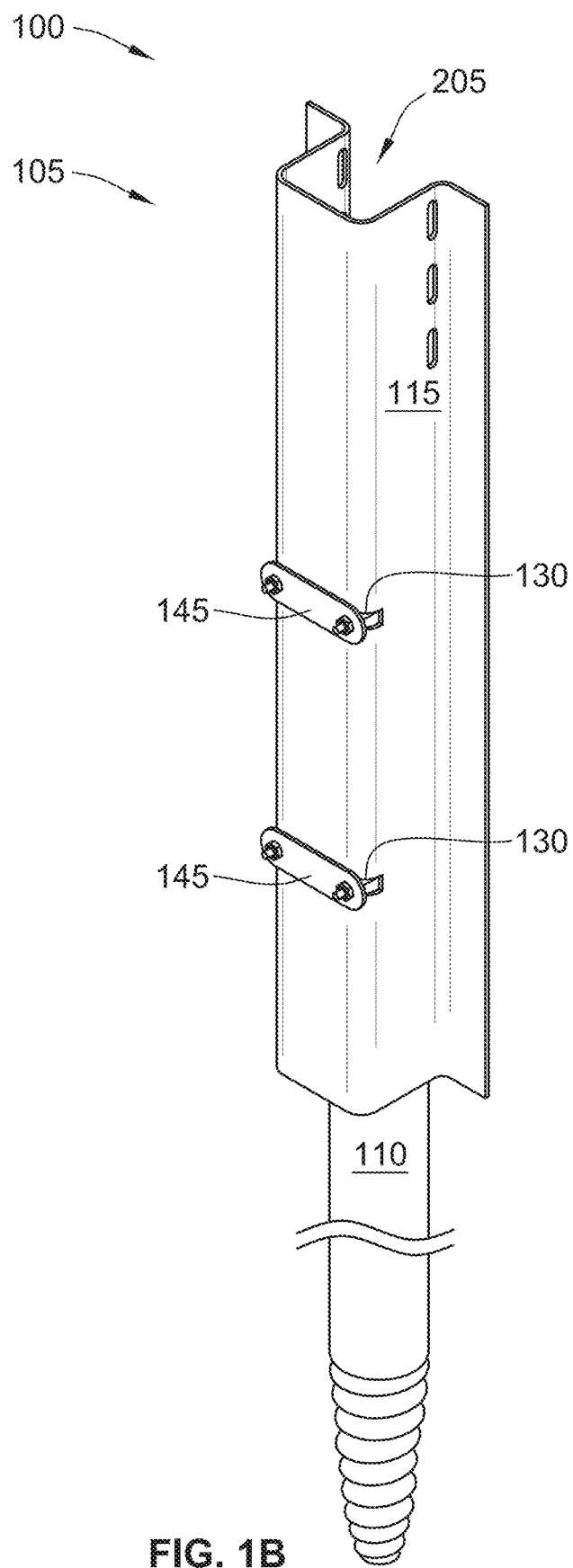
FIG. 1B is a second perspective view of the assembled support system of FIG. 1A.
Figure 2A:
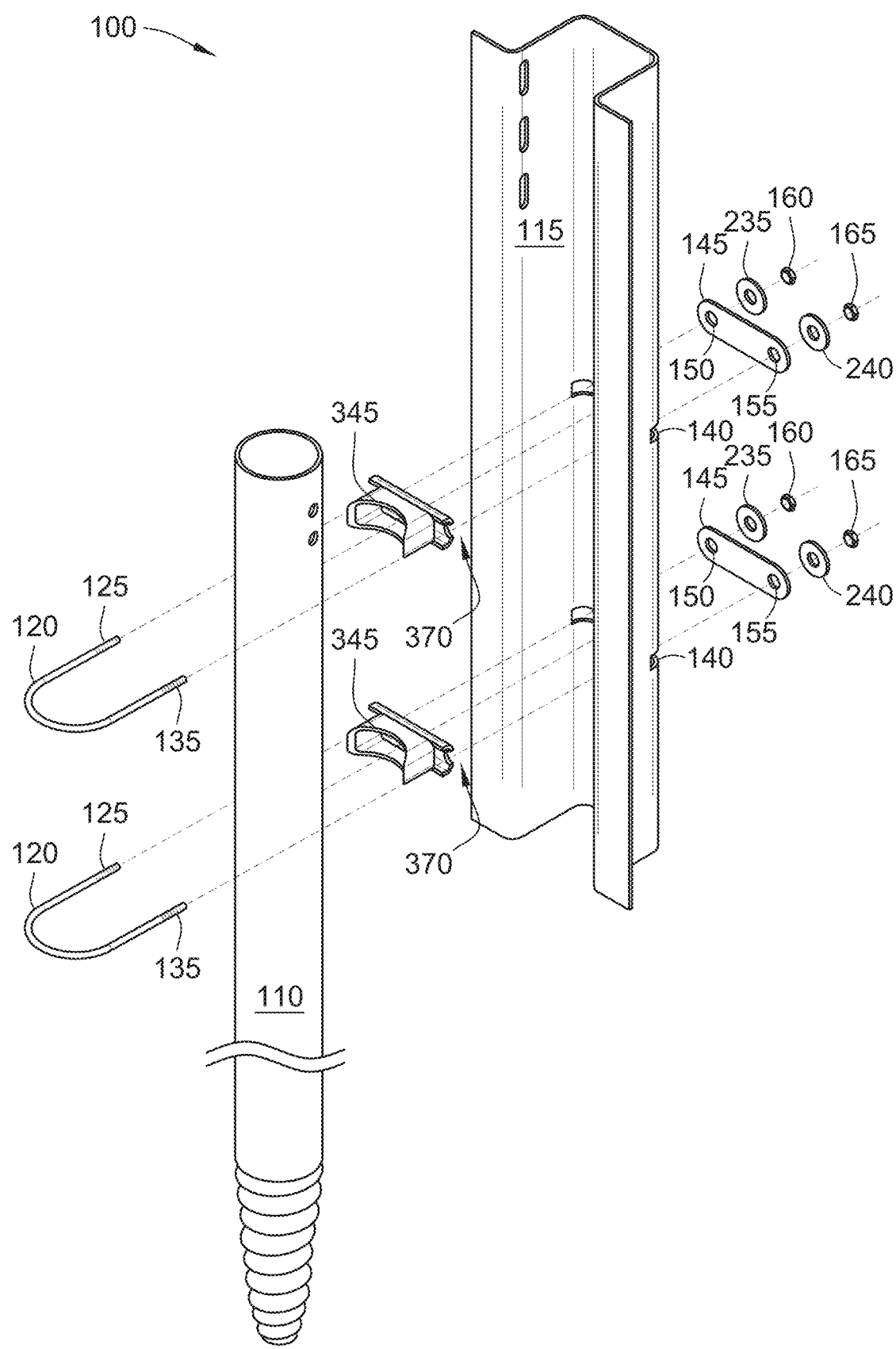
FIG. 2A is a first exploded perspective view of the support system of FIGS. 1A and 1B.
Figure 2B:
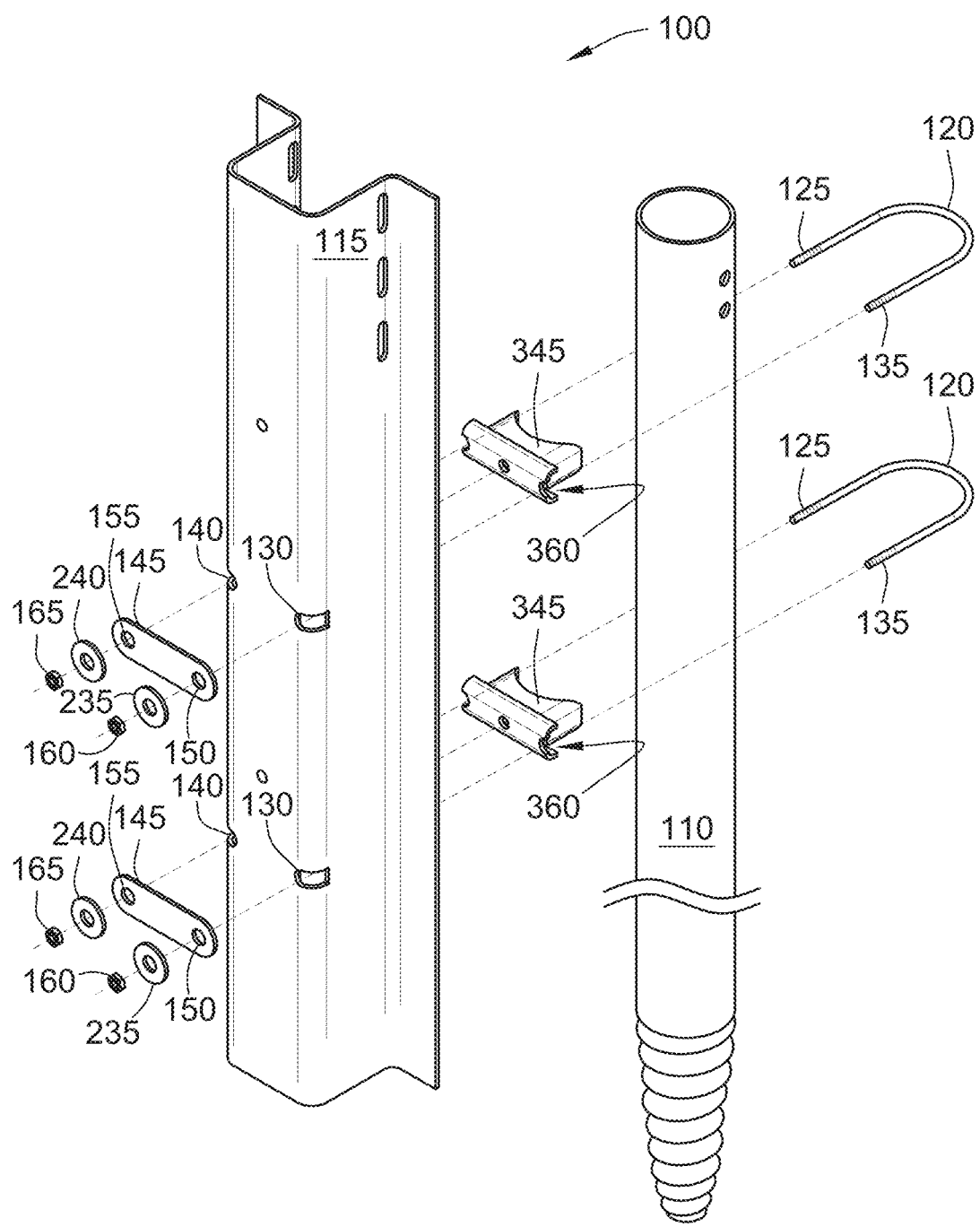
FIG. 2B is a second exploded perspective view of the support system of FIGS. 1A and 1B

A support system 100 is illustrated in an assembled state from a first side in FIGS. 1A and 1n an assembled state from a second opposite side in FIG. 1B. An exploded view of the support system 100 is illustrated from the first side in FIG. 2A and from the second side in FIG. 2B. Referring to FIGS.

1A to 2B, in some implementations the support system comprises a post 105 having a first portion 110 and a second portion 115. In some implementations the first portion 110 of the post 105 is configured to be positioned at least partially below ground. In some implementations the second portion 115 of the post 105 is configured to be coupled to the first portion 110 of the post 105 such that the second portion 115 of the post 105 is above the ground.

Still referring to FIGS. 1A to 2B, in some implementations the support system 100 further comprises a U-bolt 120 configured to abut the first portion 110 of the post 105 such that a first leg 125 of the U-bolt 120 is positioned at least partially through a first post aperture 130 of the second portion 115 of the post 105 and a second leg 135 of the U-bolt 125 is positioned at least partially through a second post aperture 140 of the second portion 115 of the post 105. In some implementations the support system 100 further comprises a plate 145 having a first plate aperture 150 and a second plate aperture 155. The plate 145 is configured to abut the second portion 115 of the post 105 such that the first plate aperture 150 at least partially aligns with the first post aperture 130 and the second plate aperture 155 at least partially aligns with the second post aperture 140. As is explained more fully hereinbelow, traditional solar panel supports lack the plate 145, which makes them far more susceptible to wind damage.

Figure 9:
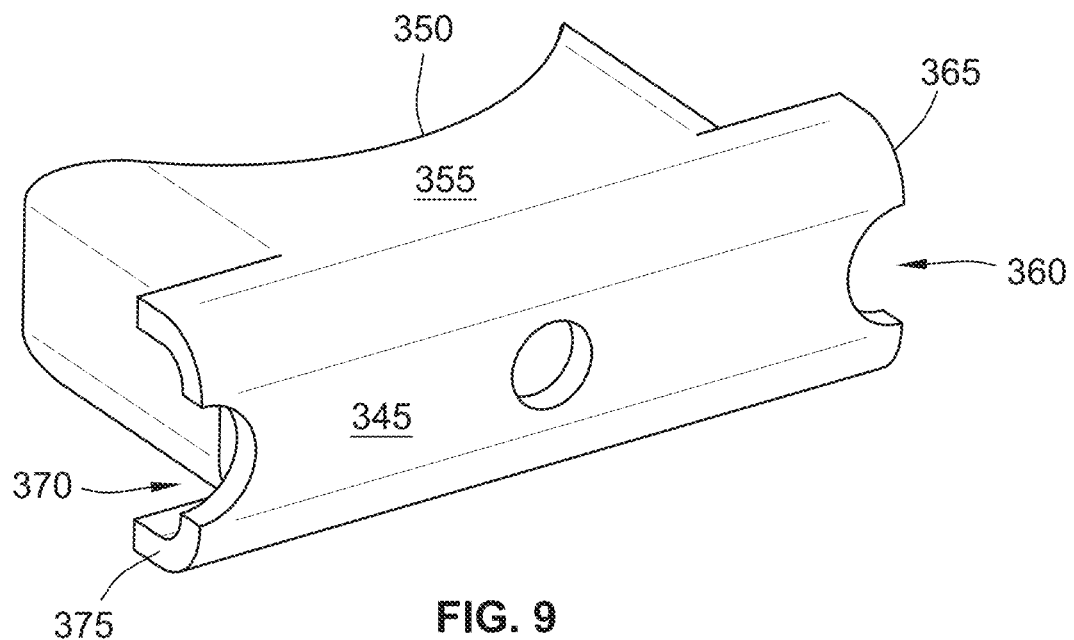
FIG. 9 is a first perspective view of an exemplary adapter bracket, according to some implementations of the present disclosure.
Figure 10:
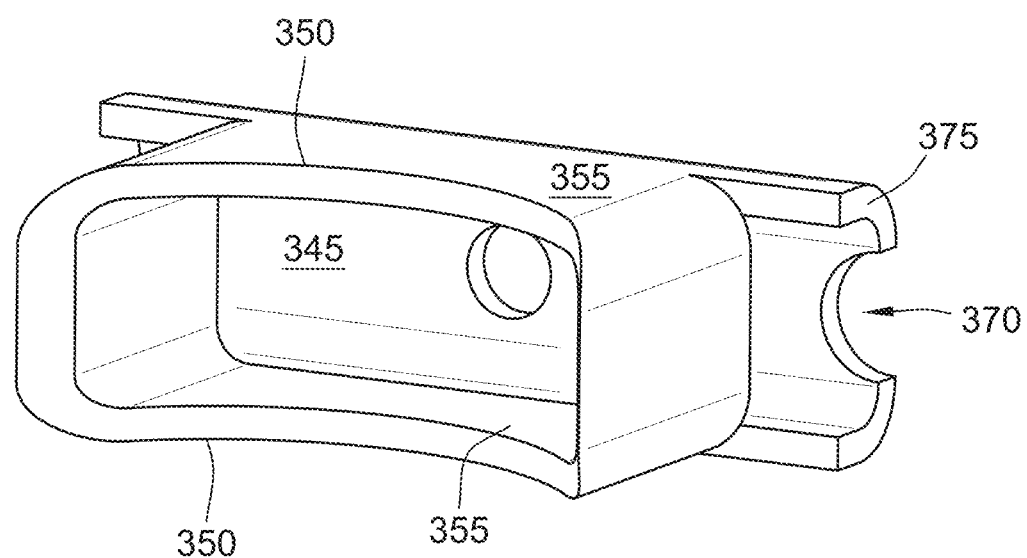
FIG. 10 is a second perspective view of the adapter bracket of FIG. 9.

In some implementations the support system 100 further comprises a first nut 160 configured to be secured to the first leg 125 of the U-bolt 120 and a second nut 165 configured to be secured to the second leg 135 of the U-bolt 120 to aid in securing the plate 145 and the second portion 115 of the post 105 to the first portion 110 of the post 105. In some implementations the support system 100 further comprises a first washer 235 disposed on the first leg 125 between the plate 145 and the first nut 160, and a second washer 240 disposed on the second leg 135 between the plate 145 and the second nut 165. In other embodiments the support system 100 further comprises an adapter bracket 345, which is described hereinbelow with regard to FIGS. 9 and 10.

Figures 3, 4:
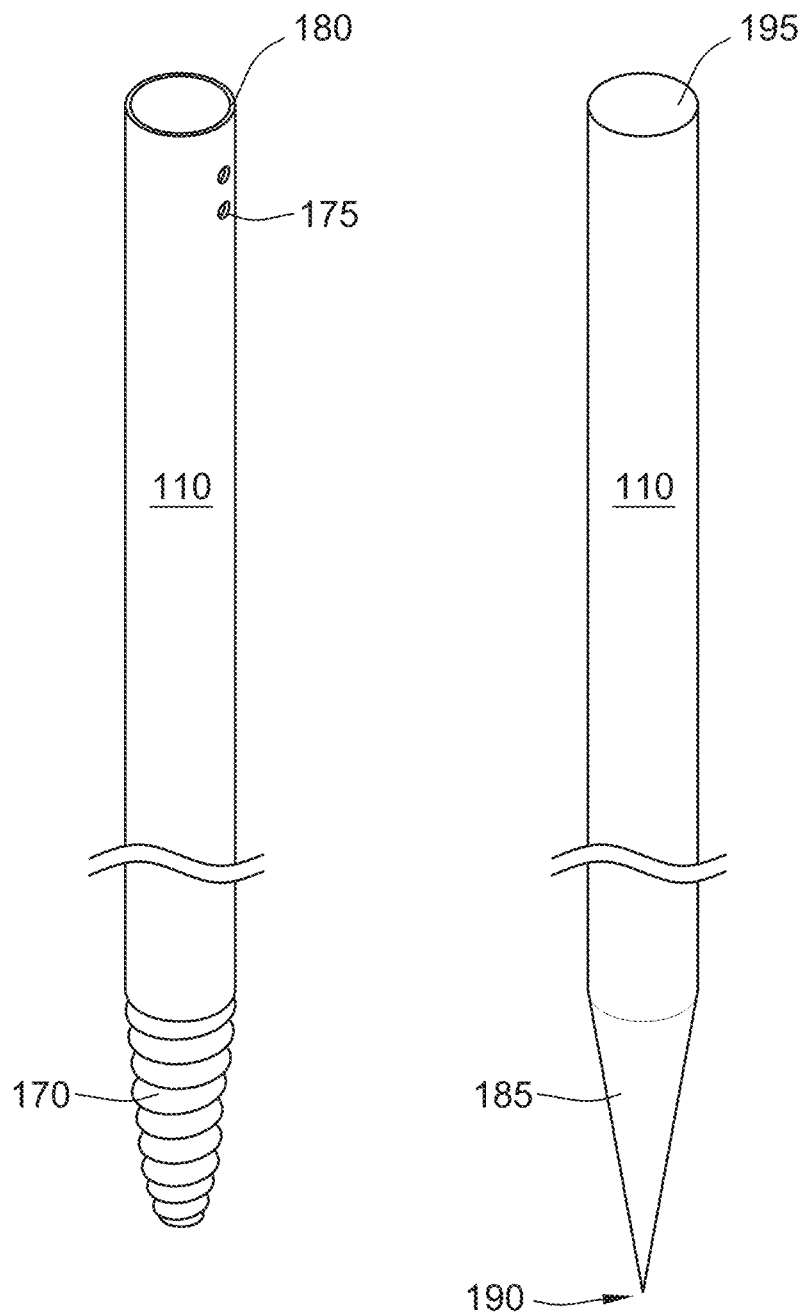
FIG. 3 illustrates an exemplary first portion of the support system, according to some implementations of the present disclosure.
FIG. 4 illustrates another exemplary first portion of the support system, according to some implementations of the present disclosure.

Referring to FIGS. 3 and 4, in some implementations the first portion 110 of the post 105 is generally cylindrical. Referring to FIG. 3, in some implementations the first portion 110 of the post 105 includes a threaded end 170 to aid in installing the first portion 110 of the post 105 at least partially below ground. For example, in some implementations the first portion 110 of the post 105 includes one or more holes 175 disposed through an end 180 of the first portion 110 opposite to the threaded end 170. The one or more holes 175 accommodate a rod or handle that can be attached to the end 180 to provide a way to apply a torque to the first portion 110 of the post 105 to drive the threaded end 170 into the ground.

Referring to FIG. 4, in some implementations the first portion 110 of the post 105 includes a taper 185 having a pointed end 190 to aid in installing the first portion 110 of the post 105 at least partially below ground. For example, in some implementations the first portion 110 of the post 105 can be held with the pointed end 190 pointed into the ground and an end 195 of the first portion 110 opposite to the pointed end 190 can be struck, for example without limitation, with a mallet, a hammer, or a shovel to drive the taper 185 having the pointed end 190, and therefore the first portion 110, into the ground. In some implementations the first portion 110 of the post 105 can be a solid rod as illustrated in FIG. 4, or can or a tube as illustrated for the implementation of the first portion 110 of the post 105 shown in FIG. 3.

Figure 5:
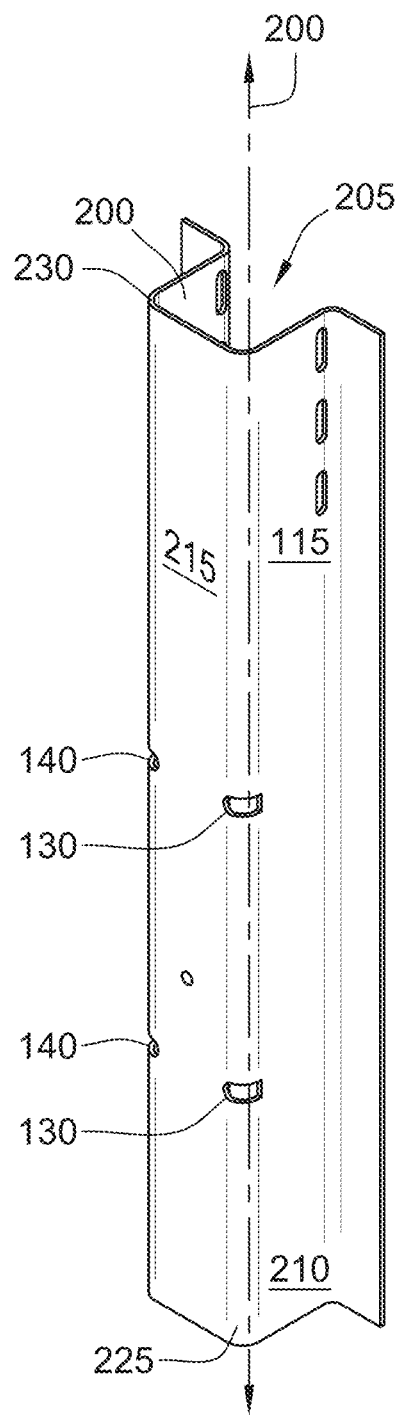
FIG. 5 is a first perspective view of an exemplary second portion of the support system, according to some implementations of the present disclosure.
Figure 6:
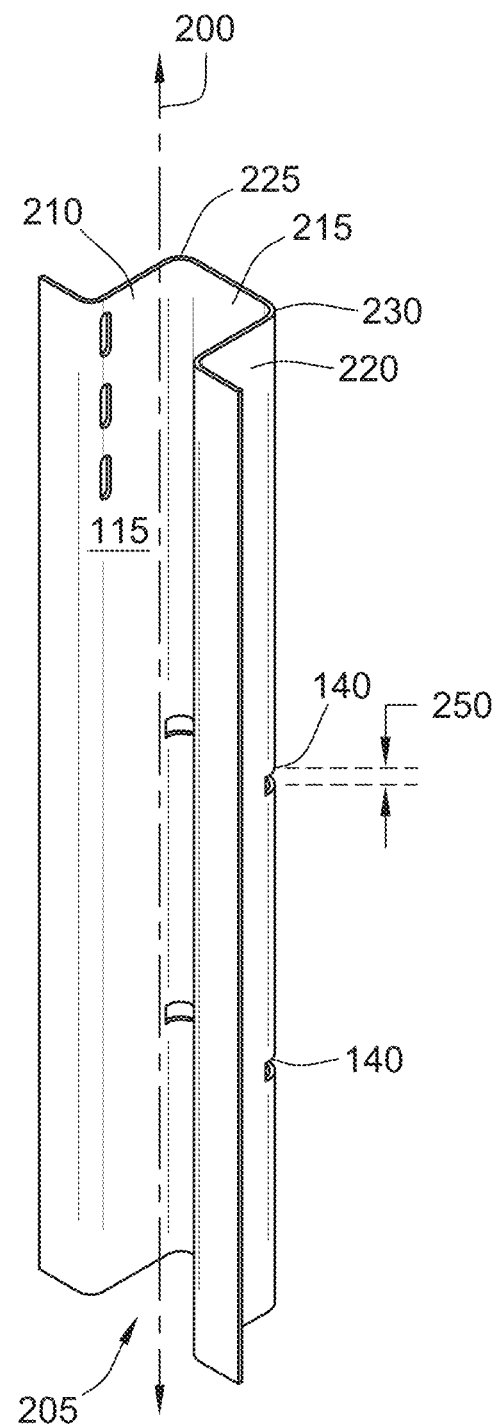
FIG. 6 is a second perspective view of the exemplary second portion of the support system of FIG. 5.

Referring to FIGS. 5 and 6, the second portion 115 of the post 105 is illustrated in a perspective view from two opposite sides. In some implementations the second portion 115 of the post 105 includes a longitudinal axis 200 and a channel 205 disposed along the longitudinal axis 200. In some implementations the channel 205 is defined by a first sidewall 210, a base 215, and a second sidewall 220. In some implementations a junction of the first sidewall 210 and the base 215 define a first seam 225 and a junction of the second sidewall 220 and the base 215 define a second seam 230. The first post aperture 130 is disposed through at least a portion of the first seam 225 and the second post aperture 140 is disposed through at least a portion of the second seam 230.

Referring again to FIGS. 2A and 2B, in some implementations the plate 145 is configured to abut a portion of the base 215 of the channel 205 of the second portion 115 of the post 105 such that the first plate aperture 150 at least partially aligns with the first post aperture 130 and the second plate aperture 155 at least partially aligns with the second post aperture 140. In some implementations the second portion 115 of the post 105 is configured to be coupled to the first portion 110 of the post 105 such that the channel 205 is configured to at least partially surround the first portion 110 of the post 105. In some implementations the first leg 125 of the U-bolt 120 and the second leg 135 of the U-bolt 120 are configured to at least partially pass through the channel 205.

Figure 7:
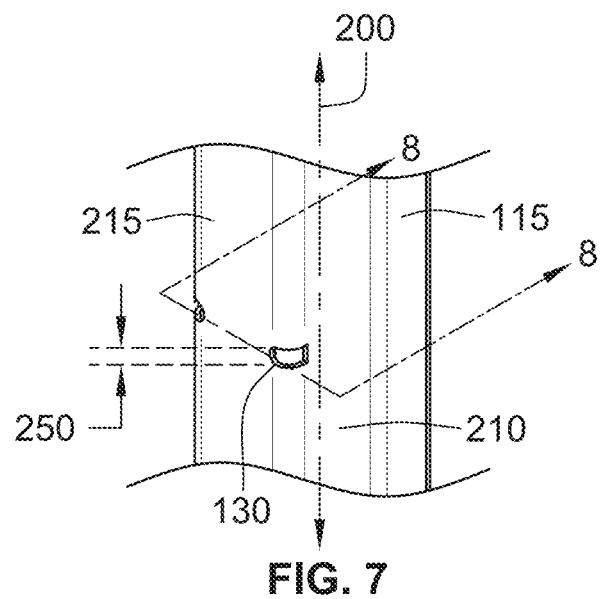
FIG. 7 is a closeup of the first perspective view of the exemplary second portion of the support system of FIG. 5.
Figure 8:
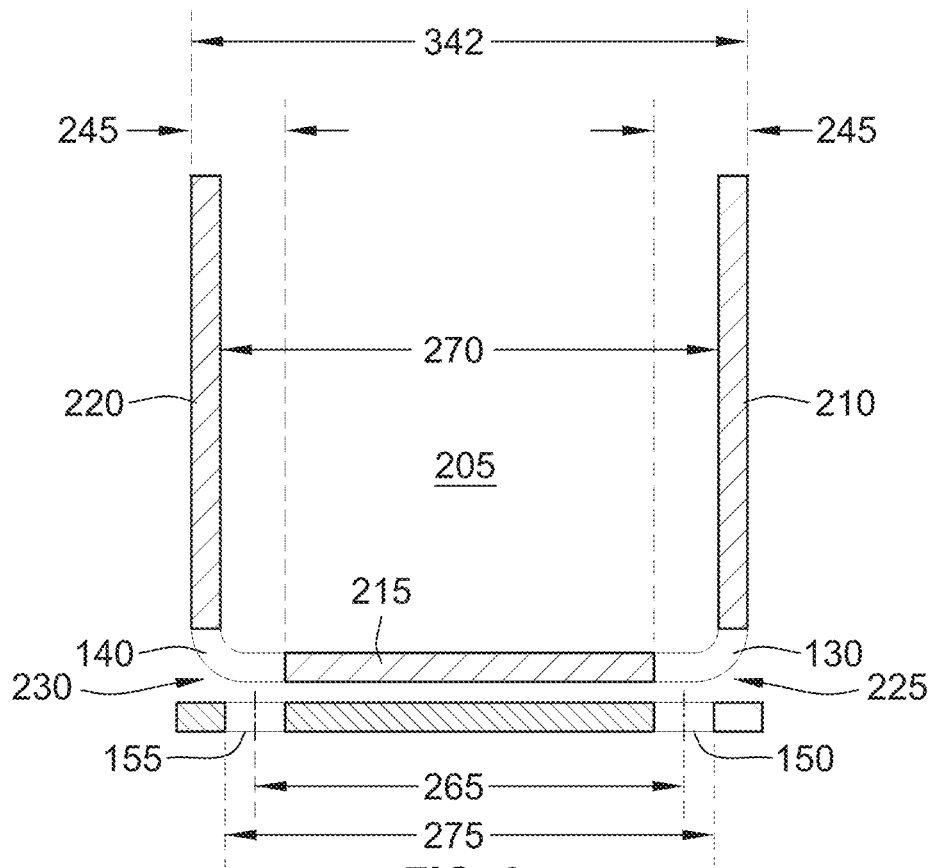
FIG. 8 is a cross-sectional view of the exemplary second portion of the support system of FIG. 5 taken generally along the lines 8-8 in FIG. 7.

Referring to FIGS. 5-8, in some implementations at least a portion of the first post aperture 130 is disposed through the first sidewall 210, the first seam 225, and the base 215. Similarly, at least a portion of the second post aperture 140 is disposed through the second sidewall 220, the second seam 230, and the base 215. Referring to FIGS. 6-8, in some implementations the first post aperture 130 has a major axis 245 oriented orthogonal to the longitudinal axis 200 and a minor axis 250 oriented parallel to the longitudinal axis 200. In some implementations the major axis 245 of the first post aperture 130 is larger than the minor axis 250 of the first post aperture 130, such that the first post aperture 130 is oblong. Similarly, in some implementations the second post aperture 140 has a major axis 255 oriented orthogonal to the longitudinal axis 200 and a minor axis 260 oriented parallel to the longitudinal axis 200. In some implementations the major axis 255 of the second post aperture 140 is larger than the minor axis 260 of the second post aperture 140, such that the second post aperture 130 is oblong.

In some implementations, the major axis 245 of the first post aperture 130 is at least 1.5 times as large as the minor axis 250 of the first post aperture 130, and the major axis 255 of the second post aperture 140 is at least 1.5 times as large as the minor axis 260 of the second post aperture 140. In other embodiments the major axis 245 of the first post aperture 130 is n times as large as the minor axis 250 of the first post aperture 130, and the major axis 255 of the second post aperture 140 is n times as large as the minor axis 260 of the second post aperture 140, where n can have any value in a range from about 1 to about 4.

This geometry for the first and second post apertures 130, 140 effectively wrapping around corners of the channel 205 at the first and second seams 225, 230, respectively, is at least partly a result of how the second portion 115 of the post 105 is manufactured. During manufacture, the second portion 115 of the post 105 starts as a flat plate of material that is transformed into the channel 205 by a bending process. Initially, first and second post apertures 130, 140 are punched through the flat plate at one or more places along the longitudinal axis 200. A first bend in the bending process is then applied to the flat plate through the first post aperture 130 and aligned with the longitudinal axis 200 to create the first seam 225. A second bend in the bending process is then applied to the flat plate through the second post aperture 140 and aligned with the longitudinal axis 200 to create the second seam 230. A result of the bending process is that each of the first and second post apertures 130, 140 extends around a corner of the channel 205 so that at least a portion of the first post aperture 130 is disposed through the first sidewall 210, the first seam 225, the base 215, and at least a portion of the second post aperture 140 is disposed through the second sidewall 220, the second seam 230, and the base 215.

Without being held to theory, because the first and second post apertures 130, 140 are disposed through the corners of the channel 205, the second portion 115 of the post 105 has an inherent line of weakness between the first and second post apertures 130, 140 orthogonal to the longitudinal axis 200. In some implementations of the support system 100 that lacks the plate 145, this geometry for the first and second post apertures 130, 140, further allows the first and second legs 125, 135 of the U-bolt 120 to spread apart under certain stress conditions or repeated cycles of certain stress conditions. Under such stress conditions, the first and second legs 125, 135 of the U-bolt 120 can spread apart sufficiently so that one or both of the first and second washers 235, 240 can partially slide off the base 215 and around a corner of the channel 205 toward the first portion 110 of the post 105. Repeated application of the stress conditions, for example resulting from wind, causes the U-bolt 120 to be pushed out of contact with the first portion 110 of the post 105, thereby loosening the assembly of the first and second portions 110, 115 of the post 105. This loosening effectively amplifies any stress caused relative motion between the first and second portions 110, 115 of the post 105. The loosening and amplified relative motion can contribute to one or both of the first and second legs 125, 135 pulling through one or both of the first and second post apertures 130, 140, respectively. The loosening and amplified relative motion can also contribute to bending of the second portion 115 and/or failure of the second portion 115 along the inherent line of weakness between the first and second post apertures 130, 140.

Referring to FIGS. 11, and 12, in some implementations the plate 145 has first and second plate apertures 150, 155 that are circular. Referring to FIG. 8, the plate 145 is illustrated in geometric relation to a cross-section of the second portion 115 of the post 105. As can be seen in FIG. 8, a distance 265 measured between centers of the first and second plate apertures 150, 155 is less than a width 270 of the base 215 measured orthogonal to the longitudinal axis 200 between the first and second sidewalls 210, 220 on an inside of the channel 205. Referring to FIGS. 8, 11, and 12, a distance 275 measured along an axis 280 defined between centers of the first and second plate apertures 150, 155 and between opposite most edges of the first and second plate apertures 150, 155 is less than or about equal to the width 270 of the base 215 measured orthogonal to the longitudinal axis 200 between the first and second sidewalls 210, 220 on an inside of the channel 205.

Referring to FIG. 11, in some implementations the plate 145 has a plate width 285 measured orthogonal to the axis 280 defined between centers of the first and second plate apertures 150, 155. In some implementations the diameter 290 of the first plate aperture 150 is in a range of about an eighth of an inch to about an inch. In some implementations the second plate aperture 155 is the same size as the first plate aperture 150. In some implementations a ratio of the width 285 to the diameter 290 of the first plate aperture 150 is in a range of about three to about ten. Without being held to theory, an increased width 285 of the plate 145 can help to provide additional stiffness and strengthening for the inherent line of weakness of the second portion 115 of the post 105 between the first and second post apertures 130, 140 orthogonal to the longitudinal axis 200.

In some implementations a first end 295 of the plate 145 has a curved edge 291 defining a first center point 292, and a second end 299 of the plate 145 has a curved edge 296 defining a second center point 297. In some implementations a center 293 of the first plate aperture 150 coincides with the first center point 292 and a center 298 of the second plate aperture 155 coincides with the second center point 297.

As illustrated in FIGS. 13 and 14, when the plate 145 is installed on the base 215, the distance 275 being smaller than the width 270 of the base 215 measured orthogonal to the longitudinal axis 200 between the first and second sidewalls 210, 220 on an inside of the channel 205 (see FIG. 8) prevents the first and second legs 125, 135 of the U-bolt 120 from spreading apart. The first and second legs 125, 135 of the U-bolt 120 are therefore constrained by the plate 145 to remain within the bounds of the channel 205.

Figure 15:
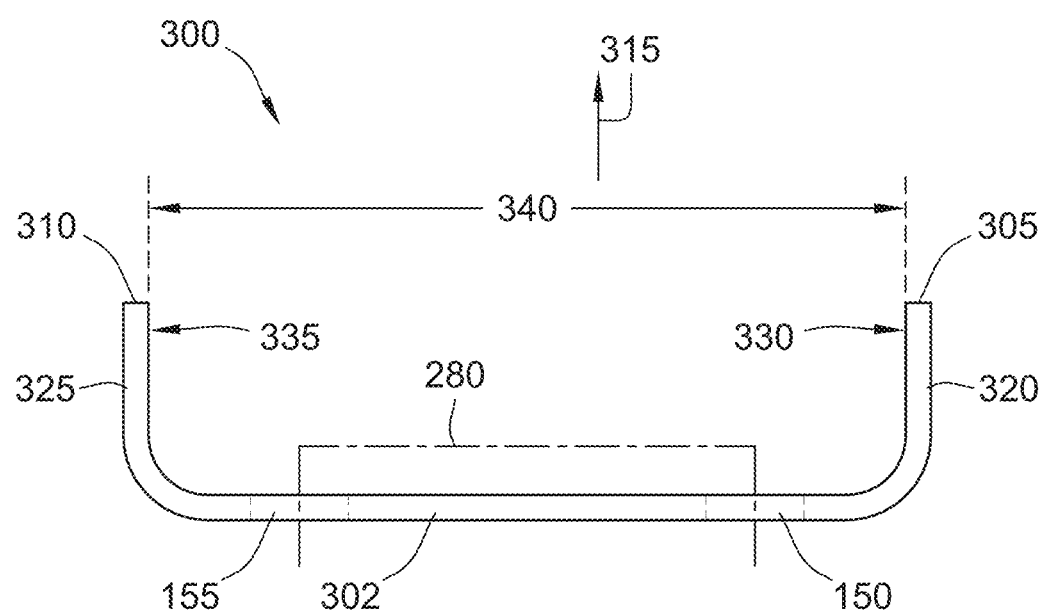
FIG. 15 a side view of another exemplary plate, according to some implementations of the present disclosure.

Referring to FIG. 15, in some implementations a plate 300 is similar to the plate 145 illustrated in FIG. 11, for example, the plate 300 has the axis 280 defined between centers of the first and second plate apertures 150, 155. However, the plate 300 differs from the plate 145 because opposite edges 305, 310 of the plate 300 along the axis 280 are bent in a common direction 315 generally orthogonal to the plate 300 and to the axis 280 to form a pair of extensions 320, 325 having facing surfaces 330, 335, respectively. Stated another way, in some implementations the plate 300 has a main portion 302 and the pair of extensions, or opposing end portions, 320, 325 that are generally perpendicular to the main portion 302 of the plate 300.

In some implementations a distance 340 between the facing surfaces 330, 335 is greater than or about equal to a width 342 of the second portion 115 measured orthogonal to the longitudinal axis 200 between the first and second sidewalls 210, 220 on an outside of the channel 205 (see FIG. 8). Stated another way, in some implementations the main portion 302 of the plate 300 is sized such that responsive to the main portion 302 of the plate 300 abutting the base 215 of the channel 205, a first one of the end portions 320 of the plate 300 is configured abut the first sidewall 210 of the channel 205 and a second one of the end portions 325 of the plate 300 is configured abut the second sidewall 220 of the channel 205.

Referring to FIGS. 2A, 2B, 9 and 10, in some implementations the support system 100 further comprises an adapter bracket 345 that is positioned within the channel 205 at least partially between the first portion 110 of the post 105 and the second portion 115 of the post 105. In some implementations the adapter bracket 345 has two curved edges 350 of two walls 355, where the two curved edges 350 face the first portion 110 of the post 105 and accommodate curvature of the first portion 110 of the post 105 (see FIGS. 2A and 2B). In some implementations the adapter bracket 345 further comprises a first recess 360 in a first end 365 and a second recess 370 in a second opposite end 375. The first recess 360 is sized to allow passage of the first leg 125 of the U-bolt 120 therethrough, and the second recess 370 is sized to allow passage of the second leg 135 of the U-bolt 120 therethrough, for example, to help align the adapter bracket 345 between the first and second portions 110, 115 of the post 105.

One or more elements or aspects or steps, or any portion(s) thereof, from one or more of any of the above implementations and/or the below claims can be combined with one or more elements or aspects or steps, or any portion(s) thereof, from one or more of any of the other above implementations and/or below claims or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A support system comprising:
   a post having a first portion and a second portion;
      the first portion of the post being configured to be positioned at least partially below ground;
      the second portion of the post being configured to be coupled to the first portion of the post such that the second portion of the post is above the ground, the second portion of the post having a channel disposed along a longitudinal axis of the post, the channel being defined by a first sidewall, a base, and a second sidewall, a junction of the first sidewall and the base defining a first seam and a junction of the second sidewall and the base defining a second seam;
   the second portion of the post having a first post aperture and a second post aperture, the first post aperture being through at least a portion of the first seam and the second post aperture being through at least a portion of the second seam;
   a U-bolt configured to abut the first portion of the post such that a first leg of the U-bolt is positioned at least partially through the first post aperture of the second portion of the post and a second leg of the U-bolt is positioned at least partially through the second post aperture of the second portion of the post;
   a plate having a first plate aperture and a second plate aperture, the plate being configured to abut a portion of the base of the channel of the second portion of the post such that the first plate aperture at least partially aligns with the first post aperture and the second plate aperture at least partially aligns with the second post aperture; and
   a first nut configured to be secured to the first leg of the U-bolt and a second nut configured to be secured to the second leg of the U-bolt to aid in securing the plate and the second portion of the post to the first portion of the post.

2. The support system of claim 1, wherein the second portion of the post is configured to be coupled to the first portion of the post such that the channel is configured to at least partially surround the first portion of the post.

3. The support system of claim 1, wherein the first portion of the post includes a threaded end to aid in installing the first portion of the post at least partially below ground.

4. The support system of claim 1 wherein the first portion of the post is at least partially tapered with a pointed end to aid in installing the first portion of the post at least partially below ground.

5. The support system of claim 1, wherein the first portion of the post is generally cylindrical.

6. The support system of claim 5, further comprising an adapter bracket positioned at least partially between the first portion of the post and the second portion of the post.

7. The support system of claim 6, wherein the adapter bracket has two curved edges of two walls that accommodate curvature of the first portion of the post.

8. The support system of claim 6, wherein the adapter bracket is positioned within the channel.

9. The support system of claim 6, wherein the adapter bracket has a first recess in a first end and a second recess in a second opposite end, the first recess sized to allow passage of the first leg of the U-bolt therethrough, and the second recess sized to allow passage of the second leg of the U-bolt therethrough.

10. The support system of claim 1, wherein at least a portion of the first post aperture is disposed through the first sidewall, the first seam, and the base, and wherein at least a portion of the second post aperture is disposed through the second sidewall, the second seam, and the base.

11. The support system of claim 1, wherein the first post aperture has a major axis and a minor axis such that the first post aperture is oblong, and wherein the second post aperture has a major axis and a minor axis such that the second post aperture is oblong.

12. The support system of claim 11, wherein the major axis of the first post aperture is at least 1.5 times larger than the minor axis of the first post aperture, and wherein the major axis of the second post aperture is at least 1.5 times larger than the minor axis of the second post aperture.

13. The support system of claim 1, wherein a distance between centers of the first plate aperture and second plate aperture is less than a width of the base of the channel.

14. The support system of claim 1, wherein a distance between opposite most edges of the first plate aperture and second plate aperture is less than or about equal to a width of the base of the channel.

15. The support system of claim 1, wherein a ratio of a width of the plate to a diameter of the first plate aperture is between about three and about ten.

16. The support system of claim 1, wherein the first plate aperture is circular and wherein the second plate aperture is circular.

17. The support system of claim 16, wherein a first end of the plate has a curved edge defining a first center point and a second end of the plate has a curved edge defining a second center point, and wherein a center of the first plate aperture coincides with the first center point and a center of the second plate aperture coincides with the second center point.

18. The support system of claim 1, wherein the plate has a main portion and two opposing end portions, and wherein the two opposing end portions of the plate are generally perpendicular to the main portion of the plate.

19. The support system of claim 18, wherein the main portion of the plate is sized such that responsive to the main portion of the plate abutting the base of the channel, a first one of the end portions of the plate is configured to abut the first sidewall of the channel and a second one of the end portions of the plate is configured to abut the second sidewall of the channel.

20. The support system of claim 1, further comprising a first washer disposed on the first leg of the U-bolt between the plate and the first nut, and a second washer disposed on the second leg of the U-bolt between the plate and the second nut.

* * * * *